（12）United States Patent
Williams et al.

(10) Patent No.: US 7,235,935 B2
(45) Date of Patent: Jun. 26, 2007

(54) PASSIVE COMPENSATION OF FOCUS TRACKING UTILIZING WINDING AND CAPACITOR

(75) Inventors: Kevin Michael Williams, Indianapolis, IN (US); Michael Edward Boyer, Fishers, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 376 days.

(21) Appl. No.: 10/511,933

(22) PCT Filed: Apr. 15, 2003

(86) PCT No.: PCT/US03/11893

§ 371 (c)(1),
(2), (4) Date: Oct. 19, 2004

(87) PCT Pub. No.: WO03/090235

PCT Pub. Date: Oct. 30, 2003

(65) Prior Publication Data

US 2006/0164018 A1 Jul. 27, 2006

Related U.S. Application Data

(60) Provisional application No. 60/373,876, filed on Apr. 19, 2002.

(51) Int. Cl.
*G09G 1/04* (2006.01)
(52) U.S. Cl. .................................. 315/382
(58) Field of Classification Search .......... 315/368.18, 315/368.25, 382, 387, 390, 391, 392, 397
See application file for complete search history.

(56) References Cited

U.S. PATENT DOCUMENTS

| 4,549,216 A | 10/1985 | Yuki |
| 4,645,990 A | 2/1987 | Willis |
| 4,742,270 A | 5/1988 | Fernsler et al. |
| 4,825,129 A | 4/1989 | Nero |
| 6,252,361 B1 * | 6/2001 | Fernsler ...................... 315/411 |
| 6,256,074 B1 | 7/2001 | Wilber et al. |
| 6,404,147 B1 * | 6/2002 | Shigematsu et al. ... 315/368.21 |
| 6,445,145 B1 * | 9/2002 | Oosuga et al. ........... 315/382.1 |
| 6,456,020 B1 * | 9/2002 | Park ........................... 315/411 |
| 8,580,232 | 6/2003 | Gries et al. |
| 6,847,404 B1 * | 1/2005 | Jackson et al. ............. 348/378 |

OTHER PUBLICATIONS

Copy of Search Report dated Jun. 29, 2003.

* cited by examiner

*Primary Examiner*—Shih-Chao Chen
*Assistant Examiner*—Minh Dieu A
(74) *Attorney, Agent, or Firm*—Joesph J. Laks; Robert D. Shedd; William A. Lagoni

(57) ABSTRACT

A video display apparatus includes a cathode ray tube and a high voltage transformer. The high voltage transformer incorporates a high voltage winding for producing an anode voltage in the cathode ray tube. The high voltage winding has a tap which provides a focus voltage for the electron gun assembly of the cathode ray tube. The transformer also includes a primary winding which is included in a resonant circuit. A third winding has a second portion that is wound to be closely coupled to the portion of the high voltage winding not associated with the generation of focus voltage. The third winding is coupled between the primary winding and a capacitor to produce a current that controls a variation of a ratio between the focus voltage and the anode voltage as a function of variation in a beam current in the cathode ray tube.

7 Claims, 3 Drawing Sheets

PASSIVE COMPENSATION OF FOCUS TRACKING UTILIZING WINDING AND CAPACITOR

CROSS REFERENCE TO RELATED APPLICATIONS

This application claims the benefit under 35 U.S.C. § 365 of International Application PCT/US03/11893, filed Apr. 15, 2003, which was published in accordance with PCT Article 21(2) on Oct. 30, 2003 in English and which claims the benefit of U.S. Provisional Patent Application No. 60/373,876, filed Apr. 19, 2002.

BACKGROUND OF THE INVENTION

This invention relates to high voltage transformers for video display apparatus and, in particular, to high voltage transformers that utilize a tertiary winding to generate a focus voltage.

The electron gun assembly of a color cathode ray tube produces one or more electron beams which impinge upon a phosphor display screen in a predetermined pattern to form a scanned raster. The electron gun assembly is designed to produce a number of spatial regions of different voltage potentials through which the electron beam or beams pass. One of these voltage potential regions provide focusing of the beams so that the spots formed when the beams strike the display screen are of a desirable size and sharpness.

The focus voltage or potential may be generated by providing a tap on the high voltage or tertiary winding of the high voltage transformer. The electron gun assembly used in one prior art utilizes a high voltage winding tapped to provide a focus voltage nominally equal to one-third of the high voltage or ultor potential. Changes in electron beam current, due to variations in picture brightness, may require that the focus ratio (i.e., the ratio of the focus voltage level to the high voltage level) remain constant regardless of the loading on the high voltage winding. As the electron beam current increases, however, the loading on the high voltage supply also increases, which may cause the high voltage level to decrease, resulting in an increase in the focus ratio. Some picture tubes incorporate an electron gun assembly that, in order to produce optimally focused beams, require the focus ratio to remain constant as beam current increases.

SUMMARY OF THE INVENTION

A focus voltage generator, embodying an inventive feature, in a video display apparatus having a cathode ray tube includes a high voltage transformer including a first winding, a focus winding, a high voltage winding and a tracking winding. The tracking winding is disposed closer to the focus winding than to the high voltage winding to provide a tighter magnetic coupling to the focus winding than to the high voltage winding. A semiconductor switch is responsive to a periodic signal and coupled to a resonant circuit that includes the first winding for generating resonant pulses in the first winding. The resonant pulses are transformer coupled to the high voltage winding to generate an ultor voltage at an ultor voltage electrode of the cathode ray tube and is transformer coupled to the focus winding to generate a focus voltage at a focus electrode of the cathode ray tube. A a capacitance is coupled to the tracking winding to generate from the resonant pulses a current in the capacitance and in the tracking winding that selects a mode of tracking between the focus and ultor voltages, as a function of a beam current in the cathode ray tube.

DESCRIPTION OF THE PREFERRED EMBODIMENTS

Figure 1:
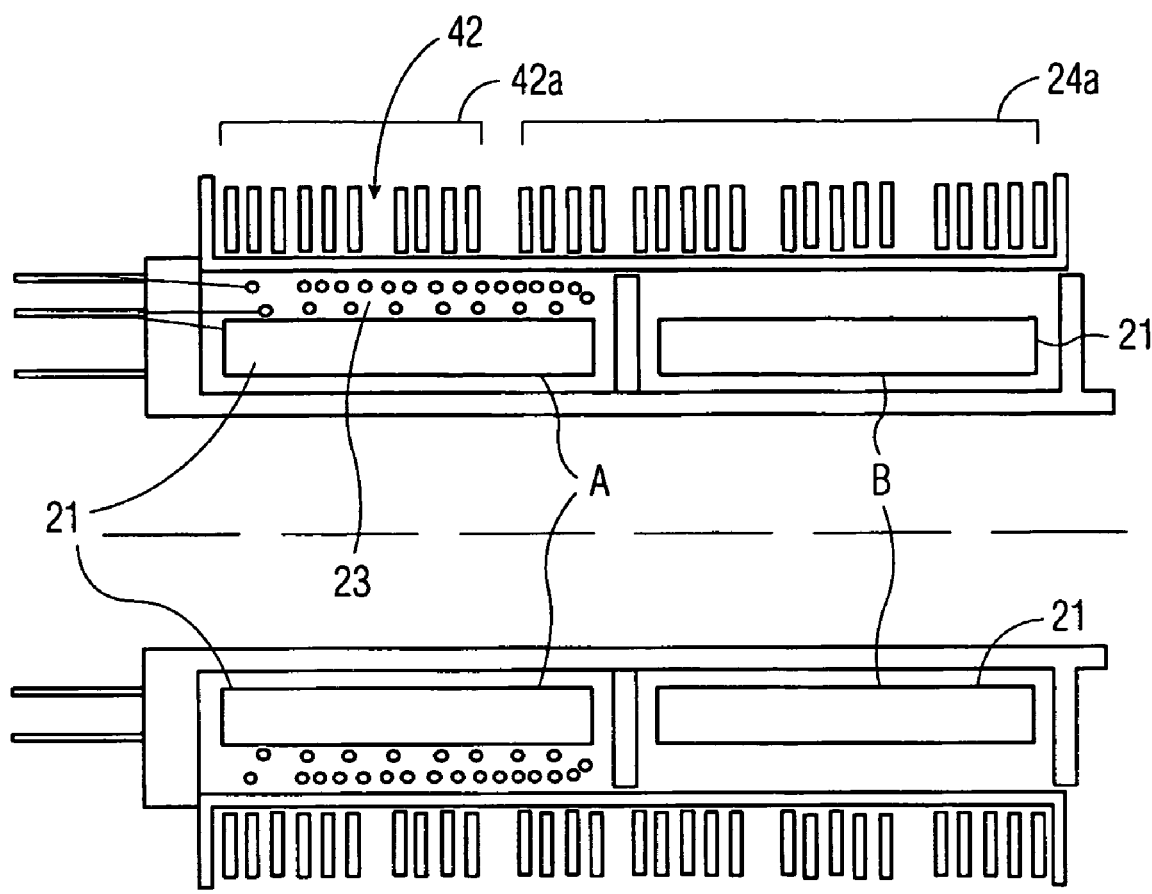
FIG. 1 is a cross-sectional view of a high voltage transformer in accordance with an aspect of the present invention.
Figure 2:
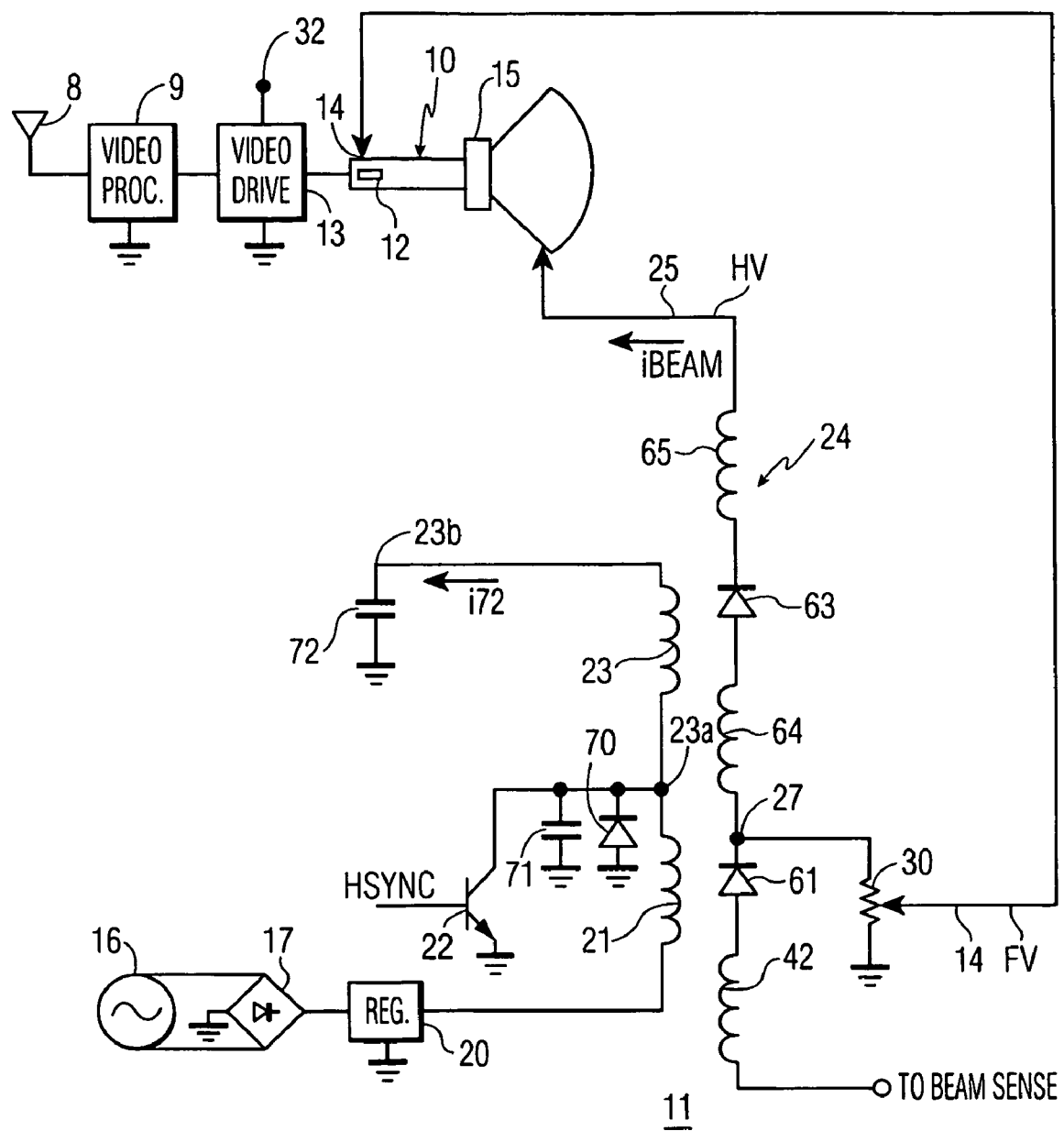
FIG. 2 is a schematic and block diagram of a portion of a video display apparatus that includes the transformer of FIG. 1.

Referring to FIG. 2, there is shown a portion of a video display apparatus including a cathode ray tube or picture tube 10 and a high voltage transformer 11 having a winding structure shown in FIG. 1. Video signals illustratively received via antenna 8 of FIG. 2 are applied to video processing circuitry 9, which demodulates and decodes the signal in an appropriate manner for application to video drive circuit 13. The output of video drive circuit 13 is applied to picture tube 10, which incorporates an electron gun assembly 12. Electron gun assembly 12, when energized, may illustratively produce three electron beams. Various operating voltage levels may be applied to electron gun assembly 12, including a focus voltage via a terminal 14. The electron beams are deflected to form a scanned raster by deflection yoke 15.

A source of AC voltage 16 is coupled to a rectifying circuit 17 which produces an unregulated DC voltage level that is applied to a regulator 20. Regulator 20 may illustratively be of various types, such as switched-mode regulators. An end terminal 23a of a primary winding 21 of a high voltage transformer 11 is coupled in common with a collector of a switching, output transistor 22 and with an end terminal of a tracking winding 23. An output of regulator 20 is coupled in common with the other one terminal of primary winding 21. The base of output transistor 22 is responsive to a control signal HSYNC produced in a conventional driver stage, not shown. Control signal HSYNC is selectively provided at either 2 H horizontal frequency having a period $T_{2H}$ or at 2.14 H horizontal frequency having a period $T_{2.14H}$. The term H refers to the horizontal frequency of a standard. For example, the value of H in the United States television broadcasting standard, NTSC, is 15.75 KHz. The frequency of signal HSYNC is an integer multiple of a frequency of a horizontal deflection current, not shown, in a horizontal deflection winding 15. The collector of transistor 22 is coupled to a damper diode 70 and to a flyback capacitor 71, in a conventional manner.

High voltage transformer 11 includes a high voltage winding 24, comprising three winding segments: a focus winding 42, an extension, high voltage winding 64 and an extension, high voltage winding 65. Rectifying diodes 61 and 63 are included between the corresponding windings. Windings 42, 64 and 65 are energized by pulses produced in primary winding 21, during the horizontal retrace interval. An ultor or a high voltage HV is applied from a terminal of winding 65 to an anode or ultor terminal of picture tube 10 via a conductor 25. A tap 27 on high voltage winding 24 provides a focus voltage FV that is applied to electron gun assembly 12 via terminal 14. Tap 27 is selected so that the voltage at tap 27 is nominally of the order of one-third the level of high voltage HV. The focus voltage generating portion of high voltage winding 24 will therefore comprise one-third of the full traverse of high voltage winding 24; i.e., one-third of the total number of winding turns of high voltage winding 24. The focus voltage is supplied from tap 27 to terminal 14 via a potentiometer 30. The other two-third of the total number of winding turns of high voltage winding 24 form high voltage windings 64 and 65 that contribute to high voltage HV significantly more than to focus voltage FV.

Tracking winding 23 of transformer I1, embodying an inventive feature, is coupled between the collector of transistor 22 and a terminal 23b of a tracking capacitor 72. Capacitor 72 is coupled between tracking winding 23 and a common potential or ground. A loading current i72 flows in a current path that includes capacitor 72 and winding 23.

Figure 3:
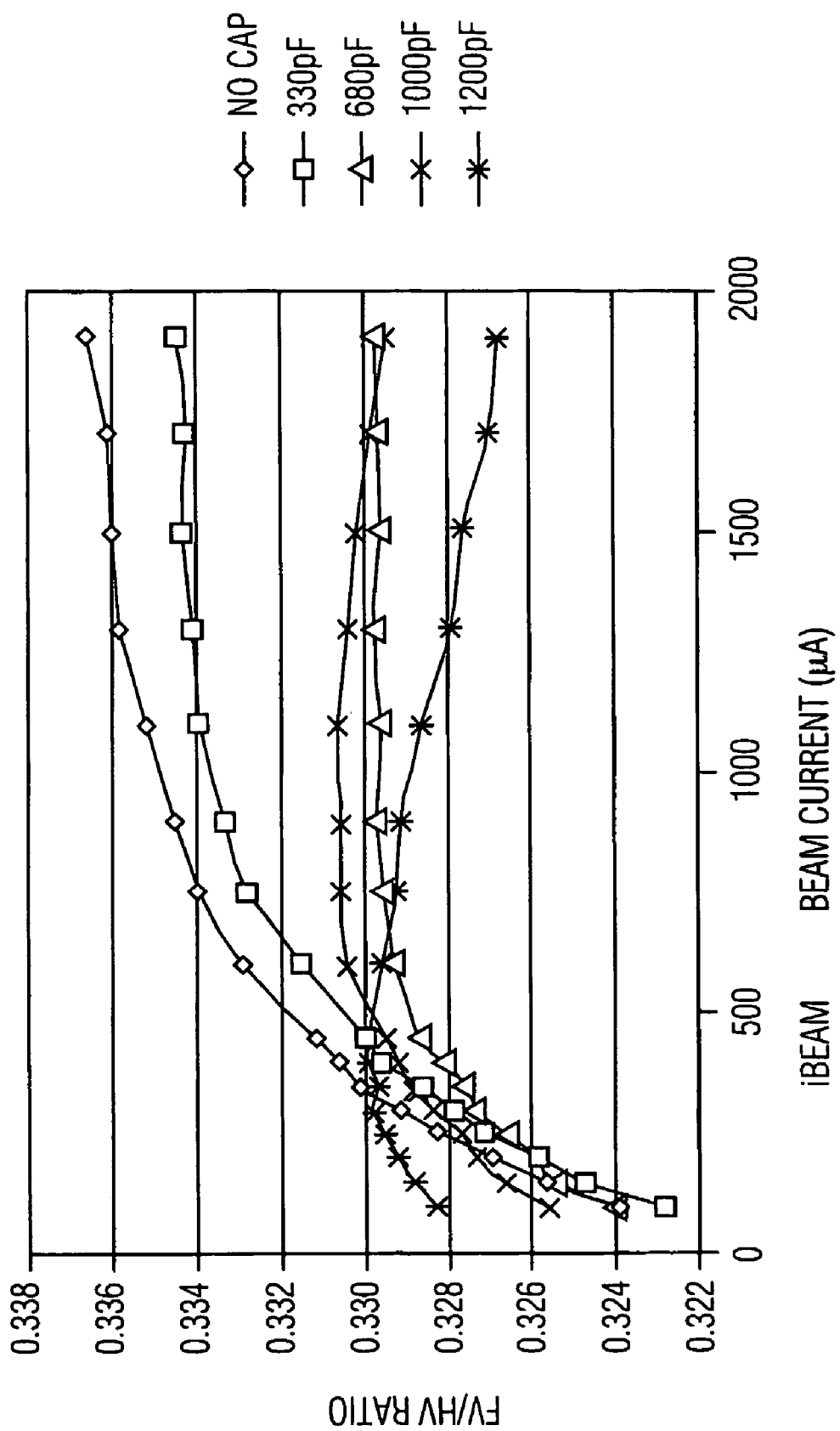
FIG. 3 is a graph illustrating a relationship inherent in the operation of the transformer shown in FIG. 1.

FIG. 3 shows the effect of various values of tracking capacitor 72 on a ratio FV/HV between focus voltage FV and high voltage HV as a function of a beam current iBeam. Similar symbols and numeral in FIGS. 2 and 3 indicate similar items or functions. A magnitude of current i72 of FIG. 3 that is determined by the value of capacitor 72 of FIG. 2 establishes the degree of compensation. The appropriate choice results in an optimized curve of FIG. 3 having, for example, the flattest response and is associated with a value of 1000 pf of capacitor 72 of FIG. 2.

FIG. 1 shows a cross section of high voltage transformer 11. Similar symbols and numeral in FIGS. 1, 2 and 3 indicate similar items or functions.

In FIG. 1, the cross section shows a segment A of primary winding 21 and a segment B of primary winding 21 that, together, overlap high voltage windings 65 and 64 and focus winding 42. Slots 24a are used for holding in place high voltage windings 64 and 65 and slots 42a are used for holding in place focus winding 42. Tracking winding 23 is wound such that it forms an extension of primary winding 21 and is wound back under focus winding 42 forming a focus section of high voltage winding 24. The close proximity of focus tracking winding 23 to the turns of focus winding 42 allows sufficient coupling to modify the variation of the ratio between voltages FV and HV as a function of beam current ibeam. The selection of the ratio is obtained by selecting the value of capacitor 72 that determines current i72 in capacitor 72 in a manner to load focus winding 42.

In carrying out another inventive feature, end terminal 23b of focus tracking winding 23 that is closer to capacitor 72 is at a lower potential, with respect to ground than end terminal 23a of focus tracking winding 23 that is closer to the collector of output transistor 22. Thereby, advantageously, a higher voltage on capacitor 72 is avoided to prevent an increase voltage stress in an insulation between the windings of transformer 1.

What is claimed is:

1. A focus voltage generator in a video display apparatus having a cathode ray tube, comprising:
 a high voltage transformer including a first winding, a focus winding, a high voltage winding and a tracking winding, said tracking winding being disposed closer to said focus winding than to said high voltage winding to provide a tighter magnetic coupling to said focus winding than to said high voltage winding;
 a semiconductor switch responsive to a periodic signal and coupled to a resonant circuit that includes said first winding for generating resonant pulses in said first winding, said resonant pulses being transformer coupled to said high voltage winding to generate an ultor voltage at an ultor voltage electrode of said cathode ray tube and being transformer coupled to said focus winding to generate a focus voltage at a focus electrode of said cathode ray tube; and
 a capacitance coupled to said tracking winding to generate from said resonant pulses a current in said capacitance and in said tracking winding that selects a mode of tracking between said focus and ultor voltages, as a function of a beam current in said cathode ray tube.

2. The focus voltage generator according to claim 1 wherein said resonant pulses are at a frequency that is an integer multiple of a current in a horizontal deflection winding.

3. The focus voltage generator according to claim 1 wherein said first and tracking windings are conductively coupled to each other.

4. The focus voltage generator according to claim 1 wherein said first and tracking windings form corresponding portions of a primary winding.

5. The focus voltage generator according to claim 1 wherein each of said first and tracking windings and a main current conducting terminal of a switching transistor that is included in said semiconductor switch is coupled at a common junction terminal.

6. The focus voltage generator according to claim 5 wherein a terminal of said tracking winding that is coupled closer to said capacitance develops a lower voltage than a terminal of said tracking winding that is coupled closer to said main current conducting terminal of said switching transistor.

7. The focus voltage generator according to claim 1 wherein said high voltage winding and said focus winding are coupled to each other at a common junction terminal and wherein said ultor voltage is generated from both said high voltage winding and said focus winding.

* * * * *